US012662385B2

(12) United States Patent
Arimitsu et al.

(10) Patent No.: US 12,662,385 B2
(45) Date of Patent: Jun. 23, 2026

(54) HYDROPHOBIC SILICA PARTICLES, USE OF SAME, AND METHOD FOR PRODUCING HYDROPHOBIC SILICA PARTICLES

(71) Applicant: AGC SI-TECH CO., LTD., Kitakyushu (JP)

(72) Inventors: Shinnosuke Arimitsu, Fukuoka (JP); Naoyuki Izumi, Fukuoka (JP)

(73) Assignee: AGC SI-TECH CO., LTD., Kitakyushu (JP)

( * ) Notice: Subject to any disclaimer, the term of this patent is extended or adjusted under 35 U.S.C. 154(b) by 35 days.

(21) Appl. No.: 18/338,725

(22) Filed: Jun. 21, 2023

(65) Prior Publication Data

US 2023/0348283 A1     Nov. 2, 2023

Related U.S. Application Data

(63) Continuation of application No. PCT/JP2021/046393, filed on Dec. 15, 2021.

(30) Foreign Application Priority Data

| Dec. 25, 2020 | (JP) | 2020-217209 |
| May 12, 2021 | (JP) | 2021-081180 |

(51) Int. Cl.
     *C01B 33/12*     (2006.01)

(52) U.S. Cl.
     CPC ........ *C01B 33/124* (2013.01); *C01P 2006/12* (2013.01)

(58) Field of Classification Search
     CPC .......... A61K 2800/10; A61K 2800/612; A61K 2800/651; A61K 8/0241; A61K 8/25; A61K 8/34; A61K 8/342; A61Q 1/00; A61Q 19/00; C01B 33/124; C01B 33/18; C01P 2004/32; C01P 2004/61; C01P 2006/12; C01P 2006/19; C09C 1/30; C09C 1/3063; C09C 3/08
     See application file for complete search history.

(56) References Cited

U.S. PATENT DOCUMENTS

| 4,443,357 | A | * | 4/1984 | Maloney | D21H 17/68 162/158 |
| 2011/0318581 | A1 | | 12/2011 | Zenitani et al. | |
| 2016/0326003 | A1 | | 11/2016 | Ishizuka | |
| 2019/0380930 | A1 | * | 12/2019 | Choi | C01B 33/18 |
| 2023/0149270 | A1 | | 5/2023 | Oki et al. | |

FOREIGN PATENT DOCUMENTS

| CN | 105793195 | A | | 7/2016 | |
| CN | 111138890 | A | * | 5/2020 | C08L 7/00 |
| JP | 47-38693 | A | | 12/1972 | |
| JP | 2008-105918 | A | | 5/2008 | |
| JP | 2016-183263 | A | | 10/2016 | |
| JP | 2019-85368 | A | | 6/2019 | |
| KR | A-2012-0000484 | | | 1/2012 | |
| WO | WO 2018/182107 | A1 | | 10/2018 | |
| WO | WO-2019093199 | A1 | * | 5/2019 | A61K 8/025 |
| WO | WO-2020220099 | A1 | * | 11/2020 | A61K 8/0216 |

OTHER PUBLICATIONS

An et al. Colloids and Surfaces A, Physiochem. Eng. Asp. 2010, 369, 218-222 (Year: 2010).*
Oki et al. WO2019093199A1 English Machine Translation (Year: 2019).*
Gui et al. CN111138890A English (Year: 2020).*
International Search Report issued Mar. 1, 2022 in PCT/JP2021/046393, filed on Dec. 15, 2021, 2 pages.
Fan Zong-qing et al., "Surface Modification and Characterization of Silica Using Behenyl Alcohol with Long Alkyl Group", Journal of Synthetic Crystals p. 233-237, vol. 44, No. Jan. 1, 2015 (with English Abstract and English Translation).
R E. Carroll, Inc., Zeosil 142 Data Sheet No. 2QA7617FN Version 5 date: Mar. 2013, 1 page URL: https://www.recarroll.com/cw3/Assets/product_files/Zeosil%20142%20PDS.pdf.
Igor Novak et al., "New Types of Nanocomposites Based on Ethylene Copolymers", News in Chemistry, Biochemistry and Biotechnology p. 45-51, 2014.
Masahiko Kamada, Engineering Materials p. 20-21, vol. 68, No. 12, 2020 (with Partial English Translation).
Hiroshi Utsugi et al., "Dehydration and Surface-Treatment of Silica Gels with Alcohols in Hydrocarbons with High Boiling Point by Reflux Method", Journal of the Society of Materials Science, Japan, p. 54-58, No. 24, vol. 262, Jul. 1975 (with English Abstract and Partial English Translation).
Extended European Search Report issued Apr. 8, 2025, in corresponding European Patent Application No. 21910552.5, 14 pages.
Dion M. et al., "The formation of hydrophobic films on silica with alcohols", Colloids and Surfaces A: Physiochemical and Engineerings Aspects, Elsevier, Amsterdam, NL, vol. 362, No. 1-3, XP XP027046594, Jun. 5, 2010, pp. 65-70.
Simpson Edgar Alan: "Partial translation of D1", Apr. 23, 1971 (Apr. 23, 1971), XP093261415, 1 page Retrieved from the Internet: URL: Third Party's observations.

* cited by examiner

*Primary Examiner* — Sally A Merkling
*Assistant Examiner* — Jordan W Taylor
(74) *Attorney, Agent, or Firm* — Oblon, McClelland, Maier & Neustadt, L.L.P.

(57) ABSTRACT

The present invention relates to hydrophobic silica particles including silica particles each being impregnated with a higher alcohol having 19 or more carbon atoms, and having a binding degree of the higher alcohol to the silica particles of 70% or more measured by the following measuring method: the measuring method: 1 g of the hydrophobic silica particles is dispersed in 10 mL of tetrahydrofuran, and after maintaining the dispersed state for 5 minutes, a filtered residue is washed with 20 mL of tetrahydrofuran and 20 mL of hexane and dried, and a ratio, represented by Equation (1), of a carbon content of the hydrophobic silica particles after washing to a carbon content of the hydrophobic silica particles before washing is defined as the binding degree, binding degree (%)=carbon content (%) of hydrophobic silica particles after washing/carbon content (%) of hydrophobic silica particles before washing×100 (1).

7 Claims, No Drawings

HYDROPHOBIC SILICA PARTICLES, USE OF SAME, AND METHOD FOR PRODUCING HYDROPHOBIC SILICA PARTICLES

CROSS-REFERENCE TO RELATED APPLICATIONS

This is a continuation of International Application No. PCT/JP2021/046393 filed on Dec. 15, 2021, and claims priority from Japanese Patent Applications No. 2020-217209 filed on Dec. 25, 2020 and No. 2021-081180 filed on May 12, 2021, and the entire contents of which are incorporated herein by reference.

TECHNICAL FIELD

The present invention relates to hydrophobic silica particles and uses thereof, and a method for producing hydrophobic silica particles.

BACKGROUND ART

Particulate materials are used as fillers and the like in various fields. For example, in the field of cosmetics, for the purpose of improving slipperiness and tactile sensation of cosmetics on skin, covering spots, freckles, acne, and the like of skin, improving coloring and makeup effects for skin, and the like, a spherical fine particle powder is blended into cosmetics.

Fine particle powders including synthetic resins such as urethane, silicone, nylon, acryl, polystyrene, and polyethylene are widely used in powder cosmetics such as foundations and body powders because of good tactile sensation thereof.

On the other hand, microplastic beads, which are obtained by rendering a synthetic resin into fine particles, have a low specific gravity, are resistant to decomposition, and are hydrophobic, and therefore are easily released into environment without being sufficiently removed in sewage treatment facilities and the like. Furthermore, the microplastic beads are easily and incidentally eaten by marine creatures, and therefore are easy to concentrate in creatures, and because they easily adsorb hydrophobic harmful substances, they can take harmful substances into food chains. In recent years, there is a concern about the impact of such microplastic beads on the natural environment, and efforts are made worldwide to reduce the amount of microplastics generated.

Therefore, attention is paid to fine particle powders using inorganic materials such as talc, mica, kaolin, silica, calcium carbonate, and aluminum oxide. Since fine particle powders including inorganic materials are inferior to fine particles including synthetic resins in the tactile sensation on skin, surfaces of fine particles are modified to improve the tactile sensation. For example, an inorganic material is coated with silicone, a silylation agent, or the like.

However, due to a recent trend of natural orientation, naturally-derived particles that do not contain silicone or the like are desired, and various studies are conducted. For example, in Patent Literature 1, it is described that a higher alcohol is added to a solvent phase in which porous silica particles are dispersed, and the mixture is dried in a vacuum state, so that surfaces of the porous silica particles are modified to hydrophobic due to a condensation reaction between hydrophilic groups of the porous silica particles and the higher alcohol.

CITATION LIST

Patent Literature

Patent Literature 1: WO2018/182107 A1

SUMMARY OF THE INVENTION

Technical Problem

The hydrophobic porous silica particles described in Patent Literature 1 are excellent in water repellency and oil absorption by having 90% or more of surfaces thereof modified to be hydrophobic.

However, in the hydrophobic porous silica particles described in Patent Literature 1, a binding strength of the higher alcohol to the silica particles is small, and the higher alcohol is easily eliminated in oil, and therefore it is difficult to maintain the hydrophobicity.

The present invention is made in view of the above problems, and an object thereof is to provide a novel particulate material that is made of naturally derived raw materials, has high hydrophobicity, and can be stably dispersed in an oil phase.

Solution to Problem

As a result of intensive studies, present inventors found that the above problem can be solved by hydrophobic silica particles in which silica particles are impregnates with a higher alcohol having 19 or more carbon atoms, and a binding degree of the higher alcohol is 70% or more according to binding degree measurement, and completed the present invention.

The present invention relates to the following <1> to <10>.

<1> Hydrophobic silica particles including silica particles each being impregnated with a higher alcohol having 19 or more carbon atoms, and having a binding degree of the higher alcohol to the silica particles of 70% or more measured by the following measuring method:

the measuring method: 1 g of the hydrophobic silica particles is dispersed in 10 mL of tetrahydrofuran, and after maintaining the dispersed state for 5 minutes, a filtered residue is washed with 20 mL of tetrahydrofuran and 20 mL of hexane and dried, and a ratio, which is represented by Equation (1) shown below, of a carbon content of the hydrophobic silica particles after washing to a carbon content of the hydrophobic silica particles before washing is defined as the binding degree, binding degree (%)=carbon content (%) of hydrophobic silica particles after washing/carbon content (%) of hydrophobic silica particles before washing ×100 (1).

<2> The hydrophobic silica particles according to <1>, having an impregnation amount of the higher alcohol of 1.0 $\mu mol/m^2$ or more.

<3> The hydrophobic silica particles according to <1> or <2>, having a circularity of 0.95 or more.

<4> The hydrophobic silica particles according to any one of <1> to <3>, having an average particle diameter of 1 $\mu m$ to 500 $\mu m$.

<5> The hydrophobic silica particles according to any one of <1> to <4>, in which the silica particle serving as a base material has a specific surface area of 5 $m^2/g$ to 1000 $m^2/g$.

<6> The hydrophobic silica particles according to any one of <1> to <5>, having an oil absorption value of 20 mL/100 g or more.

<7> The hydrophobic silica particle according to any one of <1> to <6>, having the binding degree of 80% or more.

<8> A cosmetic including the hydrophobic silica particles according to any one of <1> to <7>.

<9> A method for producing hydrophobic silica particles, including:

heating silica particles each of which a higher alcohol having 14 or more carbon atoms is attached to at 160° C. or higher.

<10> The method for producing hydrophobic silica particles according to <9>, in which the silica particles each of which the higher alcohol having 14 or more carbon atoms is attached to are obtained by heating and mixing the higher alcohol having 14 or more carbon atoms and the silica particles substantially without using any solvent.

Advantageous Effects of Invention

Since the higher alcohol has a high binding strength, the hydrophobic silica particles of the present invention have maintained hydrophobicity and improved stability in oil. Therefore, stable water repellency can be maintained. Since the hydrophobic silica particles of the present invention include naturally derived raw materials, an effect of being friendly to the environment and human bodies is achieved. When applied to the skin, a smooth and dry, slippery sense (powdery sense) can be imparted. Therefore, the hydrophobic silica particles of the present invention can be suitably used for compositions for skin such as cosmetics, oral compositions, adsorbent compositions, pharmaceutical compositions, and the like.

DESCRIPTION OF EMBODIMENTS

The present invention will be described below, and the present invention is not limited by exemplifications in the following description.

Note that in the present invention, the term "impregnated" means a state in which a higher alcohol is bound to a surface and/or an inner surface of a pore of a silica particle.

Moreover, in the present description, "mass" is synonymous with "weight".

(Hydrophobic Silica Particles)

The hydrophobic silica particles of the present invention include silica particles each being impregnated with a higher alcohol having 19 or more carbon atoms, and having a binding degree of the higher alcohol to the silica particles measured by the following measuring method of 70% or more. Measuring method: 1 g of the hydrophobic silica particles is dispersed in 10 mL of tetrahydrofuran, and after maintaining the dispersed state for 5 minutes, a filtered residue is washed with 20 mL of tetrahydrofuran and 20 mL of hexane and dried, and a ratio, which is represented by the following Equation (1), of a carbon content of the hydrophobic silica particles after washing to a carbon content of the hydrophobic silica particles before washing is defined as the binding degree.

Binding degree (%)=carbon content (%) of hydrophobic silica particles after washing/carbon content (%) of hydrophobic silica particles before washing×100 (1)

In other words, the "binding degree" indicates a residual amount of the higher alcohol having 19 or more carbon atoms remaining in the hydrophobic silica particles after washing when the hydrophobic silica particles are washed by the above method.

Here, the carbon content of the hydrophobic silica particles can be measured by an elemental analyzer (for example, "CHN-2400" manufactured by PerkinElmer Inc.).

In the case where the binding degree of the higher alcohol having 19 or more carbon atoms to the silica particles serving as base materials is 70% or more, a stability of the hydrophobic silica particles in oil is improved, and the dispersed state can be maintained.

The binding degree is 70% or more, preferably 75% or more, more preferably 80% or more, further preferably 85% or more, and particularly preferably 90% or more. An upper limit of the binding degree is not particularly limited, and is most preferably 100%.

Examples of the higher alcohol having 19 or more carbon atoms impregnating the silica particle include chimyl alcohol, arachidyl alcohol, octyldodecanol, ethylene glycol monostearate, stearic acid monoethanolamide, glycerol monostearate, selachyl alcohol, batyl alcohol, behenyl alcohol, decyltetradecanol, and 1-tetracosanol.

The higher alcohol having 19 or more carbon atoms is preferably a higher alcohol having 19 to 36 carbon atoms, from the viewpoint of being easily available industrially and imparting sufficient water repellency to the hydrophobic silica particles. The number of carbon atoms of the higher alcohol is more preferably 30 or less, further preferably 28 or less, and particularly preferably 24 or less.

The higher alcohol having 19 or more carbon atoms may be linear or branched, and may be saturated or unsaturated.

The number of hydroxyl groups in the higher alcohol having 19 or more carbon atoms may be one or more. Practically, the number of hydroxyl groups is preferably five or less, more preferably three or less.

The higher alcohol having 19 or more carbon atoms may include a long-chain alkyl group, which may be unsaturated, and a hydroxyl group. However, a linking group may be present between the long-chain alkyl group, which may be unsaturated, and the hydroxyl group. Examples of the linking group include an ester bond, an etheric oxygen atom, and an amide bond.

The higher alcohol having 19 or more carbon atoms is further preferably one or more kinds selected from the group consisting of chimyl alcohol, arachidyl alcohol, octyldodecanol, ethylene glycol monostearate, stearic acid monoethanolamide, glycerol monostearate, selachyl alcohol, batyl alcohol, behenyl alcohol, and decyltetradecanol.

Note that the matter that the surface of the silica particles is impregnated with the higher alcohol having 19 or more carbon atoms can be confirmed from a chemical shift obtained by solid-state nuclear magnetic resonance measurement ($^{13}$C-NMR, CP/MAS method) of the hydrophobic silica particles, or from a mass chromatogram obtained by GC-MS measurement of a higher alcohol solution obtained by decomposing the hydrophobic silica particles with an alkaline aqueous solution or the like followed by solvent extracting.

The hydrophobic silica particles of the present invention preferably has an impregnation amount (impregnation density) of the higher alcohol having 19 or more carbon atoms of 1.0 μmol/m$^2$ or more. In the case where the impregnation amount of the higher alcohol having 19 or more carbon atoms is 1.0 μmol/m$^2$ or more, 20% or more of surface silanol of the silica particles is coated with the higher alcohol, and the water repellency of the hydrophobic silica particles is improved.

The impregnation amount of the higher alcohol having 19 or more carbon atoms is more preferably 1.2 µmol/m² or more, further preferably 1.3 µmol/m² or more, and particularly preferably 1.5 µmol/m² or more. Although an upper limit thereof is not particularly limited, a maximum density of silanol groups present on a surface of an amorphous silica particles that can bind with a higher alcohol is 6 µmol/m², and therefore, the impregnation amount is preferably 6 µmol/m² or less, more preferably 5 µmol/m² or less, and further preferably 4.5 µmol/m² or less.

Note that the impregnation amount (impregnation density) of the higher alcohol having 19 or more carbon atoms is calculated by the following equation using the carbon content measured by the elemental analyzer, a molecular weight of the higher alcohol, and a specific surface area of the raw material silica particles.

$$\text{Impregnation density } (\mu\text{mol/m}^2) = \frac{\text{carbon content} \times \dfrac{\text{molecular weight of higher alcohol}}{} \times 10^6}{\begin{array}{l}\text{carbon} \\ \text{atomic weight} \\ \text{of higher} \\ \text{alcohol}\end{array} \times \begin{array}{l}\text{content of} \\ \text{silica included} \\ \text{in hydrophobic} \\ \text{silica particles}\end{array} \times \begin{array}{l}\text{specific surface} \\ \text{area of the} \\ \text{raw material} \\ \text{silica particles}\end{array}} \qquad \text{[Eq. 1]}$$

A shape of the hydrophobic silica particles of the present invention is not particularly limited. A circularity of the hydrophobic silica particles is, for example, preferably 0.85 or more, and more preferably 0.88 or more. In the case where the circularity is 0.85 or more, a filling efficiency is improved when the hydrophobic silica particles are used as various fillers.

When used in cosmetics, the shape thereof is preferably spherical or nearly spherical from the viewpoint of improving a tactile sensation on skin. When used in cosmetics, the circularity of the hydrophobic silica particles is preferably 0.95 or more, more preferably 0.97 or more, further preferably 0.98 or more, and particularly preferably 0.99 or more from the viewpoint of improving the tactile sensation. In the case where the circularity of the hydrophobic silica particles is 0.95 or more, the tactile sensation when applied to skin is smooth, so that the hydrophobic silica particles can be suitably used in cosmetics.

An upper limit of the circularity is not particularly limited, and the circularity is most preferably 1.

Note that the circularity of the hydrophobic silica particles can be measured by observation with a scanning electron microscope (SEM). A maximum diameter in an X-axis direction and a maximum diameter in a Y-axis direction of particles imaged at a magnification of 10,000 with a scanning electron microscope (for example, a field emission scanning electron microscope "JSM-6701F" manufactured by JEOL Ltd.) are obtained, and the diameter in the direction where the value is large is defined as a major diameter, and the diameter in the direction where the value is small is defined as a minor diameter, and the circularity is calculated from the following equation based on the above values.

Circularity=minor diameter (µm)/major diameter (µm)

The average particle diameter of the hydrophobic silica particles of the present invention is preferably 1 µm to 500 µm. In the case where the average particle diameter is 1 µm or more, aggregation is reduced and sufficient dispersibility in a composition can be easily ensured, and in the case where the average particle diameter is 500 µm or less, the tactile sensation when blended in a composition is improved. The average particle diameter is more preferably 2 µm or more and further preferably 3 µm or more, is more preferably 300 µm or less, further preferably 100 µm or less, and particularly preferably 25 µm or less.

Note that the average particle diameter of the hydrophobic silica particles can be measured by observation with a scanning electron microscope (for example, field emission scanning electron microscope "JSM-6701F" manufactured by JEOL Ltd.). The hydrophobic silica particles are fixed to a carbon tape and coated with platinum (Pt), and is imaged at an acceleration voltage of 1 kV and an emission current of 10 µA. 30 particles are randomly extracted from an SEM image captured at a magnification of 1000, and an average value of unidirectional particle diameters (Krumbein diameters) in an X-axis is taken as the average particle diameter.

The hydrophobic silica particles of the present invention may be porous or non-porous, but is preferably porous from the viewpoint of having a large oil absorption value and being able to absorb excess sebum when applied to the skin.

A porosity of the hydrophobic silica particles depends on a specific surface area of the raw material silica particles, which serve as the base material, and can be confirmed by measuring the specific surface area of the raw material silica particles.

The hydrophobic silica particles of the present invention preferably have an oil absorption value of 20 mL/100 g or more. In the case where the oil absorption value is 20 mL/100 g or more, the hydrophobic silica particles can easily absorb sebum when adhered to the skin, and therefore can be suitably used in cosmetics. The oil absorption value of the hydrophobic silica particles is more preferably 22 mL/100 g or more, and further preferably 25 mL/100 g or more, and an upper limit thereof is not particularly limited, but from the viewpoint of maintaining a particle strength, the oil absorption value is preferably 500 mL/100 g or less, more preferably 450 mL/100 g or less, and further preferably 400 mL/100 g or less.

Note that the oil absorption value can be measured in accordance with JIS K 5101-13-1 (2004).

The hydrophobic silica particles of the present invention preferably has a dynamic friction coefficient of 0.75 or less. In the case where the dynamic friction coefficient is 0.75 or less, the particles slide with a low resistance, and the tactile sensation on the skin is improved, so that a smooth and dry, slippery sense can be exhibited. The dynamic friction coefficient is more preferably 0.60 or less, further preferably 0.50 or less, and particularly preferably 0.40 or less. Although a lower limit of the dynamic friction coefficient is not particularly limited, it is preferably 0.05 or more, more preferably 0.10 or more, and further preferably 0.15 or more.

A static friction coefficient of the hydrophobic silica particles of the present invention is preferably 0.75 or less. In the case where the static friction coefficient is 0.75 or less, the particles begin to slide with a low resistance, and the tactile sensation on the skin is improved. The static friction coefficient is more preferably 0.70 or less, further preferably 0.65 or less, particularly preferably 0.60 or less, and most preferably 0.55 or less. Although a lower limit of the static friction coefficient is not particularly limited, it is more preferably 0.01 or more, still more preferably 0.05 or more, and particularly preferably 0.10 or more.

Note that the dynamic friction coefficient can be measured using a static/dynamic friction measuring device (for example, "TL201Tt" (trade name) manufactured by Trinity- Lab. Inc.). Specifically, a urethane artificial finger is used as a contactor and artificial leather is used as a coating substrate, and the hydrophobic silica particles are applied to the artificial leather so that an adhesion amount in terms of a bulk volume per unit area is 0.8 μL/cm², friction coefficients are measured by causing the measuring device to operate with a load of 30 gf and a scanning distance of 40 mm, and an average value in a range of from 1,000 msec to 4,000 msec is employed as a dynamic friction coefficient.

Regarding the static friction coefficient, friction coefficients are measured by the same method as above, and a maximum value within a range of 0 msec to 1,000 msec is employed as the static friction coefficient.

(Method for Producing Hydrophobic Silica Particles)

The present invention also provides a method for producing hydrophobic silica particles.

The hydrophobic silica particles of the present invention are obtained by heating silica particles each of which a higher alcohol having 14 or more carbon atoms is attached to at 160° C. or higher.

Through the above step, a silanol group on the surface of the silica particle and a hydroxyl group of the higher alcohol having 14 or more carbon atoms are dehydrated and condensed to form a covalent bond, so that the bond between the surface of the silica particle and the higher alcohol having 14 or more carbon atoms becomes strong.

The silica particles each of which the higher alcohol having 14 or more carbon atoms is attached to are obtained by mixing silica particles serving as a base material and a higher alcohol having 14 or more carbon atoms.

Here, the term "attach" may be chemical bond, but mainly means physical bond, for example, physical bond such as adhesion. Whether the silica particles and the higher alcohol having 14 or more carbon atoms are uniformly attached to each other and mixed can be determined by comparing the circularity of the particles before and after mixing using a scanning electron microscope or the like.

The raw material silica particles may be porous or nonporous. The porous silica particle is a secondary particle in which primary particles of silicon dioxide aggregate to continuously form fine pores like a network.

A shape of the silica particle is not particularly limited. A circularity of the silica particles is, for example, preferably 0.85 or more, and more preferably 0.88 or more. In the case where the circularity is 0.85 or more, the filling efficiency is improved when the hydrophobic silica particles of the present invention are used as various fillers.

When used in cosmetics, the shape thereof is preferably spherical or nearly spherical from the viewpoint of improving a tactile sensation on skin. When used in cosmetics, the circularity of the silica particles is preferably 0.95 or more, more preferably 0.97 or more, further preferably 0.98 or more, and particularly preferably 0.99 or more. In the case where the silica particles have a circularity of 0.95 or more, the obtained hydrophobic silica particles can easily have a circularity of 0.95 or more.

An upper limit of the circularity is not particularly limited, and the circularity is most preferably 1.

Note that the method for measuring the circularity is as described above.

An average particle diameter of the raw material silica particles is preferably 1 μm to 500 μm. In the case where the average particle diameter thereof is 1 μm or more, aggregation is reduced and sufficient dispersibility in a composition can be easily ensured, and in the case where the average particle diameter thereof is 500 μm or less, the tactile sensation when blended in a composition is improved. The average particle diameter thereof is more preferably 2 μm or more and further preferably 3 μm or more, is more preferably 300 μm or less, further preferably 100 μm or less, and particularly preferably 25 μm or less.

Note that the average particle diameter can be calculated by obtaining an average value of unidirectional particle diameters by SEM observation in the same manner as the measurement of the average particle diameter of the hydrophobic silica particles described above.

A specific surface area of the raw material silica particles is preferably 5 m²/g to 1000 m²/g. In the case where the specific surface area of the silica particles is 5 m²/g or more, there are sufficient silanol groups necessary to bind higher alcohol having 14 or more carbon atoms. In the case where the specific surface area of the silica particles increases, the amount of higher alcohol that can impregnate can also increase, but in the case where the specific surface area thereof becomes too large, the amount of higher alcohol used also increases and a production cost becomes too high, and therefore, the specific surface area thereof is preferably 1,000 m²/g or less. The specific surface area thereof is preferably 5 m²/g or more, more preferably 10 m²/g or more, and further preferably 15 m²/g or more, and is more preferably 800 m²/g or less, and particularly preferably 600 m²/g or less.

Note that the specific surface area can be calculated using the BET method by a nitrogen adsorption method.

A pore volume of the raw material silica particles is preferably 0 mL/g to 2.5 mL/g. In the case where the pore volume thereof is 0 mL/g or more, a desired oil absorption value can be obtained, and in the case where the pore volume thereof is 2.5 mL/g or less, a strength of the particle can be maintained. The pore volume thereof is more preferably 0.1 mL/g or more, further preferably 0.15 mL/g or more, and particularly preferably 0.2 mL/g or more, and is more preferably 2.5 mL/g or less, further preferably 2.2 mL/g or less, and particularly preferably 2.0 mL/g or less.

Note that the pore volume can be calculated using the BJH method by a nitrogen adsorption method.

Note that the raw material silica particles preferably have an oil absorption value of 20 mL/100 g or more. In the case where the oil absorption value thereof is 20 mL/100 g or more, the hydrophobic silica particles can absorb sebum when applied to the skin, and therefore can be suitably used in cosmetics. The oil absorption value thereof is more preferably 22 mL/100 g or more, and further preferably 25 mL/100 g or more, and although an upper limit thereof is not particularly limited, the oil absorption value thereof is preferably 500 mL/100 g or less, more preferably 450 mL/100 g or less, and further preferably 400 mL/100 g or less.

Note that the oil absorption value can be measured in accordance with JIS K 5101-13-1 (2004).

Commercially available silica particles can be used, and examples thereof include "SUNSPHERE NP-30", "SUNSPHERE L-51", "SUNSPHERE L-52", and "FB-82" (trade names) manufactured by AGC Si-Tech Co., Ltd.

Examples of the higher alcohol having 14 or more carbon atoms include myristyl alcohol, cetyl alcohol (cetanol), 2-hexyldecanol, stearyl alcohol, cetostearyl alcohol, oleyl alcohol, linoleyl alcohol, linolenyl alcohol, isostearyl alcohol, chimyl alcohol, arachidyl alcohol, octyldodecanol, ethylene glycol monostearate, stearic acid monoethanolamide, glycerol monostearate, selachyl alcohol, batyl alcohol, behenyl alcohol, decyltetradecanol, and 1-tetracosanol.

The higher alcohol having 14 or more carbon atoms is preferably a higher alcohol having 14 to 36 carbon atoms, from the viewpoint of being easily available industrially and imparting the water repellency to the surface of the silica particles. The number of carbon atoms of the higher alcohol is more preferably 16 or more, further preferably 18 or more, particularly preferably 19 or more, and most preferably 20 or more, and is more preferably 30 or less, further preferably 28 or less, and particularly preferably 24 or less.

The higher alcohol may be linear or branched, and may be saturated or unsaturated.

The number of hydroxyl groups in the higher alcohol having 14 or more carbon atoms may be one or more. Practically, the number of hydroxyl groups is preferably five or less, more preferably three or less.

The higher alcohol having 14 or more carbon atoms may include a long-chain alkyl group, which may be unsaturated, and a hydroxyl group. However, a linking group may be present between the long-chain alkyl group, which may be unsaturated, and the hydroxyl group. Examples of the linking group include an ester bond, an etheric oxygen atom, and an amide bond.

The higher alcohol having 14 or more carbon atoms is one or more kinds selected from the group consisting of chimyl alcohol, arachidyl alcohol, octyldodecanol, ethylene glycol monostearate, stearic acid monoethanolamide, glycerol monostearate, selachyl alcohol, batyl alcohol, behenyl alcohol, and decyltetradecanol.

In the present invention, first, the silica particles and the higher alcohol having 14 or more carbon atoms are mixed so that the higher alcohol having 14 or more carbon atoms is attached to the surface of each of the silica particles (mixing step).

Since the higher alcohol having 14 or more carbon atoms are solid or viscous liquid at room temperature, it is preferable to dissolve the higher alcohol having 14 or more carbon atoms or reduce the viscosity thereof by heating and then mix with the silica particles.

A reaction temperature and a reaction time in the mixing step can be appropriately set as long as the higher alcohol having 14 or more carbon atoms melts and is attached to the silica particles.

Regarding a mixing ratio of the silica particles and the higher alcohol having 14 or more carbon atoms, the silica particles and the higher alcohol having 14 or more carbon atoms are preferably mixed so that the impregnation amount of the higher alcohol having 14 or more carbon atoms per unit specific surface area of the silica particles is 1 $\mu mol/m^2$ to 6 $\mu mol/m^2$. In the case where the impregnation amount of the higher alcohol having 14 or more carbon atoms is 1 $\mu mol/m^2$ or more, hydrophobic silica particles with sufficient hydrophobicity can be obtained. In the case where the used amount of the higher alcohol having 14 or more carbon atoms is too large, the amount of the higher alcohol remaining without attaching to the silica particles becomes large, and therefore, the impregnation amount thereof is preferably 6 $\mu mol/m^2$ or less.

The higher alcohol having 14 or more carbon atoms is more preferably mixed so that the impregnation amount thereof per unit specific surface area of the silica particles is 1.2 $\mu mol/m^2$ or more, and further preferably 1.5 $\mu mol/m^2$ or more, and is more preferably 5 $\mu mol/m^2$ or less, and further preferably 4 $\mu mol/m^2$ or less.

In the present invention, it is preferable to attach the higher alcohol having 14 or more carbon atoms to each of the silica particles substantially without using any solvent. The phrase "substantially without using any solvent" means that no solvent is intentionally added in the mixing step, and that the case where a solvent is unavoidably mixed is excluded.

Examples of the solvent include water, methanol, ethanol, and propanol, and a content of the solvent is preferably 10 mass % or less, more preferably 5 mass % or less, and most preferably not contained, with respect to 100 mass % of the higher alcohol having 14 or more carbon atoms as the raw material.

After the higher alcohol having 14 or more carbon atoms is attached to the surface of each of the silica particles in the mixing step, heat treatment is performed at a temperature of 160° C. or higher to bind the higher alcohol having 14 or more carbon atoms to the surface of each of the silica particles (binding step).

In the binding step, after the mixing step is completed, the mixture may be continuously heated to 160° C. or higher without lowering the temperature, or after the mixing step, the silica particles each of which the higher alcohol having 14 or more carbon atoms is attached to may be used once cooled to room temperature.

A reaction temperature in the binding step is 160° C. or higher, more preferably 165° C. or higher, and further preferably 170° C. or higher. Although an upper limit of the reaction temperature is not particularly limited, it is preferably 300° C. or lower and more preferably 250° C. or lower, from the viewpoint of preventing thermal decomposition of the higher alcohol having 14 or more carbon atoms as the raw material.

By heating at 160° C. or higher, the silanol groups on the surface of the silica particle and the hydroxyl groups of the higher alcohol having 14 or more carbon atoms undergo dehydration condensation to form covalent bonds, thereby increasing the binding degree therebetween.

As a heating method, a known method in the related art may be used, and examples thereof include a method of heating with a heating device, such as the Henschel mixer, a double cone dryer, the Nauta mixer, or a vibration dryer. The heat treatment is preferably performed in an inert gas atmosphere or under reduced pressure.

The reaction time in the binding step is preferably 2 hours to 8 hours. In the case where the reaction time is 2 hours or more, the condensation reaction between the silica particles and the higher alcohol having 14 or more carbon atoms proceeds appropriately, and in the case where the reaction time is 8 hours or less, high productivity can be achieved.

The reaction time is preferably 2 hour or more, and more preferably 3 hours or more, and is preferably 8 hours or less, and more preferably 7 hours or less.

After heating, by cooling, the hydrophobic silica particles being impregnated with the higher alcohol having 14 or more carbon atoms can be obtained.

(Use of Hydrophobic Silica Particles)

The hydrophobic silica particles of the present invention are suitable for use in, for example, compositions for skin, oral compositions, adsorbent compositions, and pharmaceutical compositions. The compositions for skin include, foundations, body powders, cosmetics such as lipsticks, hair cleansers such as shampoos and rinses, facial cleansers, and lotions. Specifically, by using the hydrophobic silica particles of the present invention in cosmetics such as foundations, face colors, loose powders and concealers, softness and moistness can be imparted. When used in lipsticks, liquid foundations, creams, milky lotions, lotions, and the like, it prevents stickiness, improves dispersibility in oil-based preparations, and improves storage stability. When used in hair cleansers such as shampoos and conditioners, an effect of adsorbing and removing oil stains can be achieved. Examples of the oral compositions include powder dentifrice and toothpaste. Specifically, by adding the hydrophobic silica particles of the present invention thereto, a milder polishing effect can be imparted.

EXAMPLES

Hereinafter, the present invention will be described with reference to examples, but the present invention is not limited thereto. In the following description, the same common components are used. "%" represents "mass %" unless otherwise specified. Examples 1 to 22 are working examples, and Examples 23 to 25 are comparative examples.
<Evaluation Method>
Evaluations performed on the hydrophobic silica particles of each Examples 1 to 25 and the raw material silica particles used in the production of the hydrophobic silica particles are shown below.
(Specific Surface Area and Pore Volume)
The specific surface area and the pore volume of the raw material silica particles were measured by the BET method and the BJH method based on a nitrogen adsorption method using a specific surface area and pore distribution measuring device "BELSORP-mini II" (trade name, manufactured by MicrotracBEL Corp.).
(Average Particle Diameter)
The average particle diameter of the raw material silica particles and the average particle diameter of the hydrophobic silica particles were measured by a scanning electron microscope (a field emission scanning electron microscope "JSM-6701F" manufactured by JEOL Ltd.). The particles were fixed to a carbon tape and then coated with platinum (Pt), and imaged with an acceleration voltage of 1 kV and an emission current of 10 μA, and 30 particles were randomly selected from the SEM image taken at a magnification of 1000, and an average value of unidirectional particle diameters (Krumbein diameters) in the X-axis was obtained.
(Circularity)
A maximum diameter in an X-axis direction and a maximum diameter in a Y-axis direction of particles imaged at magnification of 10,000 with a scanning electron microscope (for example, a field emission scanning electron microscope "JSM-6701F" manufactured by JEOL Ltd.) were obtained, and the diameter in the direction where the value was large was defined as a major diameter, and the diameter in the direction where the value was small was defined as a minor diameter, and the circularity was calculated from the following equation based on the above values.

$$\text{Circularity} = \text{minor diameter } (\mu m)/\text{major diameter } (\mu m)$$

(Oil Absorption Value)
The oil absorption value was measured in accordance with JIS K 5101-13-1 (2004).
(Carbon Content)
The carbon content of the hydrophobic silica particles was measured using an elemental analyzer (CHN-2400, manufactured by PerkinElmer Inc.). An amount of a sample was 10 mg, and a combustion condition was 925° C. for 60 seconds, and the carbon content was measured from the produced carbon dioxide by frontal chromatography.
(Impregnation Density)
The impregnation density of the higher alcohol in the hydrophobic silica particles was calculated by the following equation based on the value obtained by the measurement of the above "carbon content".

[Eq. 2]

$$\text{Impregnation density } (\mu mol/m^2) = \frac{\text{carbon content} \times \dfrac{\text{molecular weight of}}{\text{higher alcohol}} \times 10^6}{\begin{array}{c}\text{carbon} \\ \text{atomic weight} \\ \text{of higher} \\ \text{alcohol}\end{array} \times \begin{array}{c}\text{content of} \\ \text{silica included} \\ \text{in hydrophobic} \\ \text{silica particles}\end{array} \times \begin{array}{c}\text{specific surface} \\ \text{area of the} \\ \text{raw material} \\ \text{silica particles}\end{array}}$$

(Binding Degree)
A beaker in which 1 g of the hydrophobic silica particles was weighed out was added with 10 mL of tetrahydrofuran, and dispersed for 5 minutes with an ultrasonic cleaner. The resulting slurry was filtered, washed with an additional 20 mL of tetrahydrofuran and 20 mL of hexane, followed by drying at 70° C.
The carbon content included in the hydrophobic silica particles after washing was measured using an elemental analyzer (CHN-2400, manufactured by PerkinElmer Inc.). The carbon content in the hydrophobic silica particles before washing was also measured in the same manner, and the binding degree was calculated from the following Equation (1) based on the obtained values.

Binding degree (%)=carbon content (%) of hydrophobic silica particles after washing/carbon content (%) of hydrophobic silica particles before washing×100        (1)

(Dynamic Friction Coefficient and Static Friction Coefficient)
The friction coefficients were obtained using a static/dynamic friction measuring machine "TL201Tt" (trade name, manufactured by Trinity-Lab Inc.). A urethane artificial finger was used as a contactor, and a load was set to 30 gf, a scanning distance was set to 40 mm, and a scanning speed was set to 10 mm/sec, and artificial leather "sapurare" (manufactured by IDEATEX JAPAN Co., Ltd.) was used as a coating substrate, and the friction coefficients were measured with a coating amount of the hydrophobic silica particles in each Examples being 0.8 μL/cm$^2$ in terms of the bulk volume per unit area. Among the obtained friction coefficients, an average value in a range from 1,000 msec to 4,000 msec was employed as the dynamic friction coefficient.
The static friction coefficient was obtained from the maximum value in a range from 0 msec to 1,000 msec.
(Water Repellency)
To a beaker (10 mL capacity) weighed with 8 g of water were gently added 0.05 g of weighed hydrophobic silica particles. Then, the hydrophobic silica particles were sufficiently spread on the surface of the water by tapping 20 times, and left still at room temperature in that state.
The solution was visually observed every day to evaluate states of suspended and settled particles in the solution. Evaluation criteria are as follows, and from a practical standpoint, evaluation of A is preferable. Note that the observation was performed for 7 days.
[Evaluation Criteria]
　A (excellent): The particles were not suspended or settled even 7 days after standing.
　B (good): The particles were suspended or settled 2 days to 6 days after standing.
　C (poor): The particles were suspended or settled one day after standing.

13

(Stability in Oil)

Into to the same container (13.5 mL transparent bottle with a lid), 4 mL of water and 4 mL of liquid paraffin were weighed out, 0.05 g of the hydrophobic silica particles was added to the two-layer solution, followed by shaking 20 times. Then, the resulting mixture was left to stand at room temperature.

The mixture was visually observed every day and presence or absence of settled particles in an aqueous phase was evaluated. Evaluation criteria are as follows, and from a practical standpoint, evaluation of A is preferable. Note that the observation was performed for 7 days.

[Evaluation Criteria]

A (excellent): The particles did not settle in the aqueous phase even 7 days after standing.

B (good): The particles were settled in the aqueous phase 2 days to 6 days after standing.

C (poor): The particles were settled in the aqueous phase 1 day after standing.

Example 1

The hydrophobic silica particles being impregnated with behenyl alcohol were obtained under conditions shown in Table 1.

Into a closed container, 30 g of silica particles ("SUN-SPHERE NP-30" manufactured by AGC Si-Tech Co., Ltd., average particle diameter 4.4 μm, specific surface area 48 m²/g, oil absorption value 38 mL/100 g) and 0.9 g of behenyl alcohol ("KALCOL 220-80", manufactured by Kao Corporation) were weighed out, and placed in a water bath set at 95° C., and heated and mixed for 2 hours.

Next, 10 g of the mixture was weighed out and heated at 180° C. for 4 hours under reduced pressure. Then, the mixture was cooled and collected to thereby obtain 9.9 g of the hydrophobic silica particles.

Example 2

The hydrophobic silica particles were produced in the same manner as in Example 1, except that the amount of behenyl alcohol used was 0.75 g.

Example 3

The hydrophobic silica particles were produced in the same manner as in Example 1, except that the silica particles were changed to "SUNSPHERE L-51" (average particle diameter 6.2 μm, specific surface area 301 m²/g, oil absorption value 168 mL/100 g) manufactured by AGC Si-Tech Co., Ltd., and 15 g of the silica particles and 3.75 g of behenyl alcohol were used.

Example 4

The hydrophobic silica particles were produced in the same manner as in Example 3, except that the amount of behenyl alcohol used was 3.0 g.

Example 5

The hydrophobic silica particles were produced in the same manner as in Example 1, except that the heating temperature for the mixture was 160° C.

Example 6

The hydrophobic silica particles were produced in the same manner as in Example 1, except that arachidyl alcohol ("HAINOL 20SS" manufactured by KOKYU ALCOHOL KOGYO CO., LTD.) was used instead of behenyl alcohol.

Example 7

The hydrophobic silica particles were produced in the same manner as in Example 1, except that decyltetradecanol ("RISONOL 24SP" manufactured by KOKYU ALCOHOL KOGYO CO., LTD.) was used instead of behenyl alcohol.

Example 8

The hydrophobic silica particles were produced in the same manner as in Example 1, except that octyldodecanol ("RISONOL 20SP" manufactured by KOKYU ALCOHOL KOGYO CO., LTD.) was used instead of behenyl alcohol.

Example 9

The hydrophobic silica particles were produced in the same manner as in Example 1, except that glycerol monostearate ("NIKKOL MGS-F20V" manufactured by Nikko Chemicals Co., Ltd.) was used instead of behenyl alcohol, and 20 g of the silica particles and 0.8 g of glycerol monostearate were used.

Example 10

The hydrophobic silica particles were produced in the same manner as in Example 1, except that ethylene glycol monostearate ("NIKKOL EGMS-70V" manufactured by Nikko Chemicals Co., Ltd.) was used instead of behenyl alcohol, and 20 g of the silica particles and 0.8 g of ethylene glycol monostearate were used.

Example 11

The hydrophobic silica particles were produced in the same manner as in Example 1, except that stearic acid monoethanolamide ("Amisol SME" manufactured by Kawaken Fine Chemicals Co., Ltd.) was used instead of behenyl alcohol, and 20 g of the silica particles and 0.8 g of stearic acid monoethanolamide were used.

Example 12

The hydrophobic silica particles were produced in the same manner as in Example 1, except that selachyl alcohol ("NIKKOL selachyl alcohol V" manufactured by Nikko Chemicals Co., Ltd.) was used instead of behenyl alcohol, and 20 g of the silica particles and 0.8 g of selachyl alcohol were used.

Example 13

The hydrophobic silica particles were produced in the same manner as in Example 1, except that batyl alcohol ("NIKKOL Batyl alcohol 100" manufactured by Nikko Chemicals Co., Ltd.) was used instead of behenyl alcohol, and 20 g of the silica particles and 0.8 g of batyl alcohol were used.

Example 14

The hydrophobic silica particles were produced in the same manner as in Example 1, except that chimyl alcohol ("NIKKOL chimyl alcohol 100" manufactured by Nikko Chemicals Co., Ltd.) was used instead of behenyl alcohol, and 20 g of the silica particles and 0.8 g of chimyl alcohol were used.

Example 15

The hydrophobic silica particles were produced in the same manner as in Example 1, except that the silica particles were changed to "SUNSPHERE L-51" (average particle diameter 6.2 μm, specific surface area 301 m²/g, oil absorption value 168 mL/100 g) manufactured by AGC Si-Tech Co., Ltd., and selachyl alcohol ('NIKKOL selachyl alcohol V" manufactured by Nikko Chemicals Co., Ltd.) was used instead of behenyl alcohol, and 20 g of the silica particles and 5.0 g of selachyl alcohol were used.

Example 16

The hydrophobic silica particles were produced in the same manner as in Example 1, except that the silica particles were changed to "FB-82" (average particle diameter 7.2 μm, specific surface area 142 m²/g, oil absorption value 275 mL/100 g) manufactured by AGC Si-Tech Co., Ltd., and 10 g of the silica particles and 1.75 g of behenyl alcohol were used.

Example 17

The hydrophobic silica particles were produced in the same manner as in Example 16, except that the amount of behenyl alcohol used was 1.5 g.

Example 18

The hydrophobic silica particles were produced in the same manner as in Example 16, except that the amount of behenyl alcohol used was 1.25 g.

Example 19

The hydrophobic silica particles were produced in the same manner as in Example 16, except that the amount of behenyl alcohol used was 1.0 g.

Example 20

The hydrophobic silica particles were produced in the same manner as in Example 1, except that the silica particles were changed to "SUNSPHERE L-52" (average particle diameter 5.2 μm, specific surface area 216 m²/g, oil absorption value 292 mL/100 g) manufactured by AGC Si-Tech Co., Ltd., and 10 g of the silica particles and 2.5 g of behenyl alcohol were used.

Example 21

The hydrophobic silica particles were produced in the same manner as in Example 20, except that the amount of behenyl alcohol used was 2.25 g.

Example 22

The hydrophobic silica particles were produced in the same manner as in Example 20, except that the amount of behenyl alcohol used was 2.0 g.

Example 23

The hydrophobic silica particles were produced in the same manner as in Example 1, except that the heating temperature for the mixture was 120° C.

Example 24

The hydrophobic silica particles were produced in the same manner as in Example 1, except that the heating temperature for the mixture was 140° C.

Example 25

The hydrophobic silica particles were produced in the same manner as in Example 3, except that the heating temperature for the mixture was 120° C.

The hydrophobic silica particles of each Examples 1 to 25 were measured for circularity, average particle diameter, specific surface area, oil absorption value, carbon content, higher alcohol impregnation density, binding degree, dynamic friction coefficient and static friction coefficient, and were evaluated for the water repellency and the stability in oil. Table 2 shows results.

Note that the number of days for the water repellency and the stability in oil in Table 2 indicates the number of days elapsed when suspension or settlement of particles was confirmed.

TABLE 1

| | | Raw material silica particles | | | | Higher alcohol | | Heating condition |
| | | Average particle diameter (μm) | Specific surface area (m²/g) | Pore volume (mL/g) | Charge amount (g) | Alcohol type | Charge amount (g) | Reaction temperature (° C.) |
| | Shape | | | | | | | |
| --- | --- | --- | --- | --- | --- | --- | --- | --- |
| Example 1 | Spherical | 4.4 | 48 | — | 30 | Behenyl alcohol | 0.9 | 180 |
| Example 2 | Spherical | 4.4 | 48 | — | 30 | Behenyl alcohol | 0.75 | 180 |
| Example 3 | Spherical | 6.2 | 301 | 0.8 | 15 | Behenyl alcohol | 3.75 | 180 |
| Example 4 | Spherical | 6.2 | 301 | 0.8 | 15 | Behenyl alcohol | 3.0 | 180 |
| Example 5 | Spherical | 4.4 | 48 | — | 30 | Bchenyl alcohol | 0.9 | 160 |
| Example 6 | Spherical | 4.4 | 48 | — | 30 | Arachidyl alcohol | 0.9 | 180 |

TABLE 1-continued

| | | Raw material silica particles | | | | Higher alcohol | | Heating condition |
| | | Average | Specific | | | | | Reaction |
| | Shape | particle diameter (μm) | surface area (m²/g) | Pore volume (mL/g) | Charge amount (g) | Alcohol type | Charge amount (g) | temper-ature (° C.) |
|---|---|---|---|---|---|---|---|---|
| Example 7 | Spherical | 4.4 | 48 | — | 30 | Decyltetradecanol | 0.9 | 180 |
| Example 8 | Spherical | 4.4 | 48 | — | 30 | Octyldodecanol | 0.9 | 180 |
| Example 9 | Spherical | 4.4 | 48 | — | 20 | Glycerol monostearate | 0.8 | 180 |
| Example 10 | Spherical | 4.4 | 48 | — | 20 | Ethylene glycol monostearate | 0.8 | 180 |
| Example 11 | Spherical | 4.4 | 48 | — | 20 | Stearic acid monocthanolamide | 0.8 | 180 |
| Example 12 | Spherical | 4.4 | 48 | — | 20 | Selachyl alcohol | 0.8 | 180 |
| Example 13 | Spherical | 4.4 | 48 | — | 20 | Batyl alcohol | 0.8 | 180 |
| Example 14 | Spherical | 4.4 | 48 | — | 20 | Chimyl alcohol | 0.8 | 180 |
| Example 15 | Spherical | 6.2 | 301 | 0.8 | 20 | Selachyl alcohol | 5.0 | 180 |
| Example 16 | Bowl shape | 7.2 | 142 | 1.44 | 10 | Behenyl alcohol | 1.75 | 180 |
| Example 17 | Bowl shape | 7.2 | 142 | 1.44 | 10 | Behenyl alcohol | 1.5 | 180 |
| Example 18 | Bowl shape | 7.2 | 142 | 1.44 | 10 | Behenyl alcohol | 1.25 | 180 |
| Example 19 | Bowl shape | 7.2 | 142 | 1.44 | 10 | Behenyl alcohol | 1.0 | 180 |
| Example 20 | Spherical | 5.2 | 216 | 1.43 | 10 | Behenyl alcohol | 2.5 | 180 |
| Example 21 | Spherical | 5.2 | 216 | 1.43 | 10 | Behenyl alcohol | 2.25 | 180 |
| Example 22 | Spherical | 5.2 | 216 | 1.43 | 10 | Behenyl alcohol | 2.0 | 180 |
| Example 23 | Spherical | 4.4 | 48 | — | 30 | Behenyl alcohol | 0.9 | 120 |
| Example 24 | Spherical | 4.4 | 48 | — | 30 | Behenyl alcohol | 0.9 | 140 |
| Example 25 | Spherical | 6.2 | 301 | 0.8 | 15 | Behenyl alcohol | 3.75 | 120 |

TABLE 2

| | Physical properties of hydrophobic silica particles | | | | | | | | Evaluation | |
| | Circularity | Average particle diameter (μm) | Oil absorption value (mL/100 g) | Carbon content (%) | Impreg-nation density (μmol/m²) | Binding degree (%) | Dynamic friction coeffi-cient | Static friction coeffi-cient | Water repel-lency | Sta-bility in oil |
|---|---|---|---|---|---|---|---|---|---|---|
| Example 1 | 0.993 | 4.5 | 32 | 2.4 | 2.0 | 89 | 0.42 | 0.20 | A | A |
| Example 2 | 0.993 | 4.4 | 32 | 2.0 | 1.6 | 97 | 0.44 | 0.22 | A | A |
| Example 3 | 0.991 | 6.2 | 108 | 18.0 | 2.9 | 95 | 0.37 | 0.16 | A | A |
| Example 4 | 0.991 | 6.2 | 98 | 14.7 | 2.3 | 96 | 0.37 | 0.17 | A | A |
| Example 5 | 0.993 | 4.4 | 34 | 2.4 | 1.9 | 99 | 0.47 | 0.22 | A | A |
| Example 6 | 0.993 | 4.3 | 32 | 2.3 | 2.1 | 99 | 0.42 | 0.20 | A | A |
| Example 7 | 0.994 | 4.4 | 33 | 2.1 | 1.6 | 99 | 0.44 | 0.22 | A | A |
| Example 8 | 0.987 | 4.4 | 33 | 1.8 | 1.6 | 99 | 0.48 | 0.23 | A | A |
| Example 9 | 0.993 | 4.5 | 32 | 2.5 | 2.0 | 93 | 0.51 | 0.22 | A | A |
| Example 10 | 0.993 | 4.6 | 30 | 2.7 | 2.2 | 71 | 0.51 | 0.24 | A | A |

TABLE 2-continued

| | | Physical properties of hydrophobic silica particles | | | | | | | Evaluation | |
|---|---|---|---|---|---|---|---|---|---|---|
| | Circularity | Average particle diameter (μm) | Oil absorption value (mL/100 g) | Carbon content (%) | Impregnation density (μmol/m²) | Binding degree (%) | Dynamic friction coefficient | Static friction coefficient | Water repellency | Stability in oil |
| Example 11 | 0.993 | 4.4 | 30 | 2.4 | 2.0 | 84 | 0.55 | 0.27 | A | A |
| Example 12 | 0.992 | 4.6 | 27 | 2.4 | 2.0 | 91 | 0.55 | 0.26 | A | A |
| Example 13 | 0.993 | 4.5 | 32 | 2.2 | 1.8 | 92 | 0.60 | 0.25 | A | A |
| Example 14 | 0.993 | 4.5 | 31 | 2.1 | 1.9 | 94 | 0.63 | 0.27 | A | A |
| Example 15 | 0.989 | 6.2 | 105 | 15.8 | 2.6 | 94 | 0.45 | 0.18 | A | A |
| Example 16 | 0.892 | 7.2 | 220 | 13.4 | 4.3 | 83 | 0.75 | 0.55 | A | A |
| Example 17 | 0.892 | 7.2 | 228 | 11.5 | 3.6 | 89 | — | — | A | A |
| Example 18 | 0.892 | 7.2 | 232 | 9.6 | 2.9 | 97 | — | — | A | A |
| Example 19 | 0.892 | 7.2 | 238 | 7.6 | 2.2 | 95 | — | — | A | A |
| Example 20 | 0.993 | 7.2 | 244 | 17.3 | 3.9 | 93 | 0.43 | 0.17 | A | A |
| Example 21 | 0.993 | 7.2 | 242 | 15.4 | 3.3 | 93 | — | — | A | A |
| Example 22 | 0.993 | 7.2 | 238 | 13.4 | 2.8 | 93 | — | — | A | A |
| Example 23 | 0.993 | 4.3 | 36 | 2.5 | 2.0 | 55 | 0.42 | 0.20 | C (1 day) | B (3 days) |
| Example 24 | 0.993 | 4.4 | 36 | 2.5 | 2.0 | 69 | — | — | B (2 days) | B (4 days) |
| Example 25 | 0.991 | 6.2 | 144 | 18.0 | 2.9 | 38 | 0.36 | 0.16 | B (2 days) | B (3 days) |

From the results in Table 2, the hydrophobic silica particles of each Examples 1 to 22 have significantly higher binding degrees of higher alcohol than that of each Examples 23 to 25 in the binding degree measurement test, and it was found that the binding strength of the higher alcohol to the silica particles is high. The hydrophobic silica particles of each Examples 1 to 22 sufficiently maintained the hydrophobicity and were excellent in the water repellency and the stability in oil.

From comparison among Examples 1, 5, 23 and 24, and between Examples 4 and 25, it was found that in the case where the binding degree of the higher alcohol to the raw material silica particles is high, the water repellency and the stability in oil are excellent, and from Example 10, it was found that practically desirable water repellency and stability in oil can be obtained in the case where the binding degree is 70% or more.

Although the present invention has been described in detail with reference to specific embodiments, it is apparent to those skilled in the art that various changes and modifications can be made without departing from the spirit and scope of the present invention. The present application is based on a Japanese Patent Application (No. 2020-217209) filed on Dec. 25, 2020 and a Japanese Patent Application (No. 2021-081180) filed on May 12, 2021, the contents of which are incorporated herein by reference.

The invention claimed is:

1. A composition of hydrophobic silica particles comprising hydrophobic silica particles impregnated with a higher alcohol having 19 or more carbon atoms, the composition of hydrophobic silica particles having:

an average particle diameter of from 2 μm to 7.2 μm, an oil absorption value of from 20 mL/100 g to 400 mL/100 g, a circularity of 0.95 or more an impregnation amount of the higher alcohol of 1.0 μmol/m² or more, and a binding degree of the higher alcohol to the silica particles of 70% or more;

wherein the binding degree of the higher alcohol to the silica particles is measured by the following measuring method:

1 g of the hydrophobic silica particles is dispersed in 10 mL of tetrahydrofuran, and after maintaining the dispersed state for 5 minutes, a filtered residue is washed with 20 mL of tetrahydrofuran and 20 mL of hexane and dried, and a ratio, which is represented by Equation (1) shown below, of a carbon content of the hydrophobic silica particles after washing to a carbon content of the hydrophobic silica particles before washing is defined as the binding degree, wherein the binding degree (%)=carbon content (%) of hydrophobic silica particles after washing/carbon content (%) of hydrophobic silica particles before washing×100 (1); and wherein the hydrophobic silica particles are capable of forming a stable dispersion in a liquid paraffin phase.

2. The composition of hydrophobic silica particles according to claim 1, wherein a silica particle serving as a base material has a specific surface area of 5 m²/g to 1000 m²/g.

3. The composition of hydrophobic silica particles according to claim 1, having the binding degree of 80% or more.

4. A cosmetic comprising the composition of hydrophobic silica particles according to claim 1.

5. The composition of hydrophobic silica particles according to claim 1, wherein the higher alcohol having 19 or more carbon atoms is at least one selected from the group consisting of chimyl alcohol, arachidyl alcohol, octyldodecanol, ethylene glycol monostearate, stearic acid monoethanolamide, glycerol monostearate, selachyl alcohol, batyl alcohol, behenyl alcohol, decyltetradecanol, and 1-tetracosanol.

6. A method for producing hydrophobic silica particles according to claim 1, comprising:

heating silica particles each of which a higher alcohol having 19 or more carbon atoms is attached to at 160° C. or higher.

7. The method for producing hydrophobic silica particles according to claim 6, wherein the silica particles each of which the higher alcohol having 19 or more carbon atoms is attached to are obtained by heating and mixing the higher alcohol having 19 or more carbon atoms and the silica particles substantially without using any solvent.

\* \* \* \* \*